US012590597B2

(12) United States Patent
Joshi

(10) Patent No.: US 12,590,597 B2
(45) Date of Patent: Mar. 31, 2026

(54) WIND CHANNELLING AND DIRECTING STRUCTURES

(71) Applicant: Piyush Vasantrai Joshi, Leicester (GB)

(72) Inventor: Piyush Vasantrai Joshi, Leicester (GB)

( * ) Notice: Subject to any disclaimer, the term of this patent is extended or adjusted under 35 U.S.C. 154(b) by 362 days.

(21) Appl. No.: 18/007,220

(22) PCT Filed: Jul. 5, 2021

(86) PCT No.: PCT/GB2021/051697
§ 371 (c)(1),
(2) Date: Jan. 27, 2023

(87) PCT Pub. No.: WO2022/029401
PCT Pub. Date: Feb. 10, 2022

(65) Prior Publication Data

US 2023/0287910 A1 Sep. 14, 2023

(30) Foreign Application Priority Data

Aug. 6, 2020 (GB) ..................................... 2012220

(51) Int. Cl.
*F15D 1/10* (2006.01)
*F15D 1/04* (2006.01)
*F15D 1/06* (2006.01)
*F24F 13/00* (2006.01)

(52) U.S. Cl.
CPC ..................................... *F15D 1/10* (2013.01)

(58) Field of Classification Search
CPC .. F03D 1/04; F03D 1/041; F03D 3/049; F24F 13/00; F15D 1/065; F15D 1/10; F05B 2240/13
See application file for complete search history.

(56) References Cited

U.S. PATENT DOCUMENTS

| | | | | |
|---|---|---|---|---|
| 25,269 | A | 8/1859 | Livingston | |
| 244,831 | A | 7/1881 | Steward | |
| 250,806 | A | 12/1881 | Hamel | |
| 2,254,892 | A | 9/1941 | Grundhalt | |
| 4,319,141 | A | 3/1982 | Schmugge | |
| 2003/0156938 | A1 | 8/2003 | Verini | |
| 2008/0272603 | A1 * | 11/2008 | Baca | B60L 53/52 180/2.2 |
| 2010/0133847 | A1 * | 6/2010 | Allaei | F03D 7/02 290/55 |

(Continued)

FOREIGN PATENT DOCUMENTS

| | | | |
|---|---|---|---|
| CN | 102852717 | A | 1/2013 |
| CN | 203146235 | U | 8/2013 |
| CN | 107448352 | A | 12/2017 |

(Continued)

OTHER PUBLICATIONS

KR102234959 and translation (Year: 2021).*

*Primary Examiner* — Steven S Anderson, II
(74) *Attorney, Agent, or Firm* — The Inventor's Friend Patent Law Firm, P.L.L.C.; Nathaniel A. Wickliffe

(57) ABSTRACT

A structure (1) for channelling and directing incident wind is described. The structure includes a hollow pipe (2) having a downstream end (**2*a*) that defines at least one outlet and an upstream end (2*b*). A rotatably mounted intake (4) is positioned at the upstream end (2*b*) of the pipe (2**) and is adapted to direct incident wind into the pipe.

18 Claims, 14 Drawing Sheets

(56) References Cited

U.S. PATENT DOCUMENTS

2016/0281679 A1 9/2016 Wichers

FOREIGN PATENT DOCUMENTS

| | | | | | |
|---|---|---|---|---|---|
| CN | 207620970 | U | | 7/2018 | |
| DE | 19601156 | A1 | | 7/1997 | |
| GB | 1519878 | A | * | 8/1978 | ............... F03D 1/04 |
| GB | 2484329 | A | | 11/2012 | |
| KR | 20110049250 | A | | 5/2011 | |
| KR | 20180032950 | A | | 4/2018 | |
| KR | 102234959 | B1 | * | 4/2021 | |
| SE | 521060 | C2 | | 9/2003 | |
| WO | 2006047934 | A1 | | 5/2006 | |

* cited by examiner

WIND CHANNELLING AND DIRECTING STRUCTURES

TECHNICAL FIELD

The present invention relates to structures for channelling and directing incident wind.

SUMMARY OF THE INVENTION

The present invention provides a structure for channelling and directing incident wind comprising:

- a hollow pipe having a downstream end that defines at least one outlet, and an upstream end; and
- a rotatably mounted intake at the upstream end of the pipe adapted to direct incident wind into the pipe.

The present invention may further provide a method of channelling and directing incident wind through a hollow pipe having a downstream end that defines at least one outlet, and an upstream end, wherein incident wind is directed into the pipe through a rotatably mounted intake provided at the upstream end of the pipe.

The intake may include an opening (or vent) through which incident wind enters the intake and an internal structure that directs the wind from the opening towards the upstream end of the pipe.

The opening may have any suitable shape, e.g., it may be substantially circular, oval, rectangular or triangular. The intake itself may have any suitable shape and configuration.

The opening may be formed in an angled front part of the intake, i.e., the part which faces into the wind in use.

The intake may be rotatably mounted about a vertical axis.

The intake may be rotatably mounted relative to the fixed or stationary pipe by any suitable means such as a bearing. The intake may be driven to rotate by sensing wind direction and rotating the intake using an actuator such as an electric motor (sometimes called a "yaw motor") that is controlled by a suitable controller so that the intake opening faces the wind direction. A wind sensor may be provided to measure wind direction for this purpose. The wind sensor may also measure wind speed for adjusting the angle of the slats of a louvre assembly—see below. The intake may also comprise a directional vane (or fin) that enables the incident wind to rotate the intake so that the intake opening faces the wind direction. The directional vane may have any suitable shape.

A louvre assembly may be used to control the amount of incident wind that is permitted to enter the intake opening, and hence the amount of incident wind that is directed to the upstream end of the pipe. It will be understood that it may be necessary to limit or restrict the amount of wind entering the intake to avoid damaging the structure and any equipment located downstream of the outlet(s). In general terms, any suitable means can be provided for controlling the amount of incident wind that enters the intake or the upstream end of the pipe and it is not limited to a louvre assembly. The means may form part of the intake opening or be positioned in front of the intake opening.

The louvre assembly may include a plurality of individual slats that are pivotally mounted so that their angle may be adjusted by a suitable adjustment mechanism. The individual slats may be adjusted by pivoting them in the same direction or by pivoting adjacent slats in the opposite direction. The ends of each slat may be pivotally mounted in a support or frame, which may be integral with the intake. The adjustment mechanism may be configured to pivot one of the slats if the slats are connected together in such a way—either directly or indirectly—that allows all of the slats to be pivoted in unison.

The slats may be pivoted between a closed position where the slats lie substantially in the same plane and will often overlap slightly to form a closed barrier to prevent wind from entering the intake, and a fully open position where the slats define a plurality of open channels therebetween to allow substantially all of the incident wind to enter the intake. The louvre assembly, and in particular the slats, may cover substantially all, or just part, of the intake opening.

The angle of the slats may be adjusted based on wind speed—e.g., so that the slats are fully open when the wind speed is below a lower threshold and are closed when the wind speed is above an upper threshold. When the wind speed is greater than the lower threshold but less than the upper threshold, the slats may be adjusted gradually from the fully open position towards the closed position with increasing wind speed and vice versa. In one arrangement, the lower threshold and the upper threshold may be substantially the same so that the slats are adjusted from being fully open to being closed and vice versa—optionally with some "hysteresis" to prevent continual and rapid opening and closing of the slats when the wind speed is around the threshold level.

In one arrangement, the angle of the slats may be adjusted based on the wind speed provided by the wind sensor. The adjustment mechanism which adjusts the angle of the slats may include an actuator such as an electric motor that is controlled by a suitable controller based on the wind speed. Other actuators might include pneumatic, hydraulic or electro-mechanical actuators, for example.

In one arrangement, the angle of the slats may be adjusted mechanically based on the wind speed using a wind resistance plate as a mechanical actuator, for example. The adjustment mechanism may include a pivotally mounted wind resistance plate whose angle varies with wind speed. (It will be readily understood that wind force is proportional to wind speed—consequently, a higher wind speed will equate to a greater wind force acting on the wind resistance plate and vice versa.) The wind resistance plate may be mounted below the louvre assembly and the intake opening. The pivoting movement of the wind resistance plate may be used to adjust the angle of the slats and the adjustment mechanism may include a suitable linkage such as a lever arm mechanism or a gearing mechanism for that purpose. The wind resistance plate may be biased towards a first position where the slats are in the fully open position, and the wind resistance plate may be pivoted towards a second position by the wind force applied by the incident wind. In the second position, the slats of the louvre assembly are in the closed position. The wind resistance plate may be biased towards the first position by a spring or other suitable biasing means, for example. The biasing means may form part of the louvre assembly, e.g., the adjustment mechanism. It will be readily understood that the spring or other suitable biasing means will apply a biasing force to the wind resistance plate—either directly or indirectly through the adjustment mechanism, for example—that opposes the wind force that acts on the wind resistance plate. Consequently, the wind resistance plate will only be pivoted towards the second position if the wind force acting on the wind resistance plate exceeds the biasing force.

The wind resistance plate may be substantially L-shaped. In one arrangement, the wind resistance plate is designed so that the incident wind impinges on a first (or substantially vertical) part of the L-shaped wind resistance plate. The incident wind may pivot the first part of the wind resistance plate backwards to a second position where the slats are in the closed position. Incident wind that impinges on the first part of the wind resistance plate may be guided along a second (or substantially horizontal) part of the plate—and is preferably directed in the opposite direction to the wind direction (i.e., back towards the incident wind). In general terms, the incident wind that impinges on the first part of the wind resistance plate is preferably directed away from the intake by the second part. Incident wind that impinges on the closed slats may also be directed downwardly towards the L-shaped wind resistance plate—for example, if the louvre assembly is angled to follow the angled front part of the intake—and then directed in the opposite direction to the wind direction. If the wind speed falls below the upper threshold, the wind resistance plate may pivot back to the first position where the slats are fully open under the action of the biasing force. The interior angle between the first and second parts of the L-shaped wind resistance plate may be between about 60 and about 120 degrees, for example.

The upstream end of the pipe may be substantially vertical and may be designed to rotatably mount the intake. The downstream end of the pipe may be substantially vertical or horizontal—i.e., so that in the latter case the pipe has a change of direction with a curved part. The pipe may have any suitable cross-section, but a substantially circular cross-section will generally be preferred.

The pipe may be formed of any suitable rigid material.

The pipe may be formed from a plurality of individual pipe sections. The pipe sections may be mechanically connected together—e.g., using outwardly extending connecting flanges which receive mechanical fixings such as bolts. As noted above, the pipe sections may be straight or curved, for example.

The pipe sections may have different internal diameters (or cross-sectional areas).

For example, a pipe section located at or near the upstream end of the pipe may have a larger internal diameter (or cross-sectional area) than a pipe section located at or near the downstream end of the pipe. In this way, the internal diameter (or cross-sectional area) of the pipe may be narrowed gradually along the direction from the upstream end to the downstream end that defines the outlet(s). Narrowing the internal diameter (or cross-sectional area) of the pipe results in an increase in the wind velocity through the pipe in the downstream direction towards the outlet(s) and in a corresponding reduction in pressure.

Each pipe section may have the same internal diameter (or cross-sectional area) throughout its axial extent, or the internal diameter (or cross-sectional area) may vary—preferably the internal diameter (or cross-sectional area) will decrease in the downstream direction. Pipe sections may be connected together by intermediate sections (or couplers) which may, in particular, be used to connect straight pipe sections having different but non-varying internal diameters (or cross-sectional areas). The intermediate sections may have a frusto-conical inner surface (or sloping or angled inner surface(s)) to channel (or "funnel") the wind from one pipe section to another. The wind velocity may increase within the intermediate sections. The intermediate sections and the pipe sections may be mechanically connected together—e.g., using outwardly extending flanges which receive mechanical fixings such as bolts.

At least part of the pipe (e.g., one or more pipe sections) may include an internal helical flange or an internal helical groove (or "rifling" groove) to promote helical movement of the wind through the pipe. It is believed that promoting such helical movement, where the wind has both a linear and rotational component of movement from the upstream end of the pipe toward the downstream end, will reduce the turbulence within the hollow pipe and will help to move the incident wind through the pipe as efficiently as possible. It may also help to remove any particulates, debris or liquid droplets that are entrained in the wind, and in particular where the rotational effect of the wind can be used to expel the particulates, debris or liquid droplets through openings or slots in the pipe—see below. The pipe may include a plurality of separate helical flanges. Each flange may extend substantially perpendicular to the inner surface of the pipe and may be welded to the inner surface, for example. Each flange may have the same width throughout its helical extent, or the width may vary—preferably the width will increase in the downstream direction. (In other words, the flange may extend further into the hollow interior of the pipe at the downstream end of the flange than it does at the upstream end of the flange.) An internal helical flange may be omitted in some parts of the pipe, e.g., in any intermediate sections (or couplers) or any curved parts of the pipe. If a helical groove is provided, it may typically be in a downstream part of the pipe such as in the pipe section that defines the outlet, for example.

The vertical part of the pipe may be supported by a frame or support structure.

The pipe may include openings or slots through which any entrained particulates, debris or liquid droplets (and a small quantity of wind) may be ejected. If the pipe includes a change of direction, the openings or slots may be positioned in the curved part of the pipe. The openings or slots may in particular be positioned in the radially outer part of the curved part of the pipe. Openings or slots may also be provided in one or more of the straight pipe sections.

If the pipe includes an internal helical flange, the openings or slots in the pipe may be aligned with the helical channel defined by the internal helical flange. But it will be understood that the openings or slots may have any suitable alignment.

The structure may include at least one filter screen to prevent larger particulates and debris from entering the pipe. The filter screen may be located at the upstream end of the pipe or in the intake, for example.

The downstream end of the pipe may be divided to define two or more outlets.

The structure may form part of a wind turbine, for example. In particular, the wind turbine may further include a turbine assembly positioned at the outlet of the structure and adapted to be rotated by the wind exiting the outlet. The pipe may be positioned to channel and direct the wind on to the turbine assembly. The wind turbine may further include a rotating electrical machine (e.g., a generator) including a rotor and a stator, where the rotor is adapted to be driven to rotate by the turbine assembly to generate electricity. The turbine assembly and the rotating electrical machine may be conveniently located at low level as opposed to being housed in a nacelle or casing on the top of a tower as would normally be the case for a conventional wind turbine.

The structure may form part of a ventilation or cooling system, for example.

DRAWINGS

Figure 1:
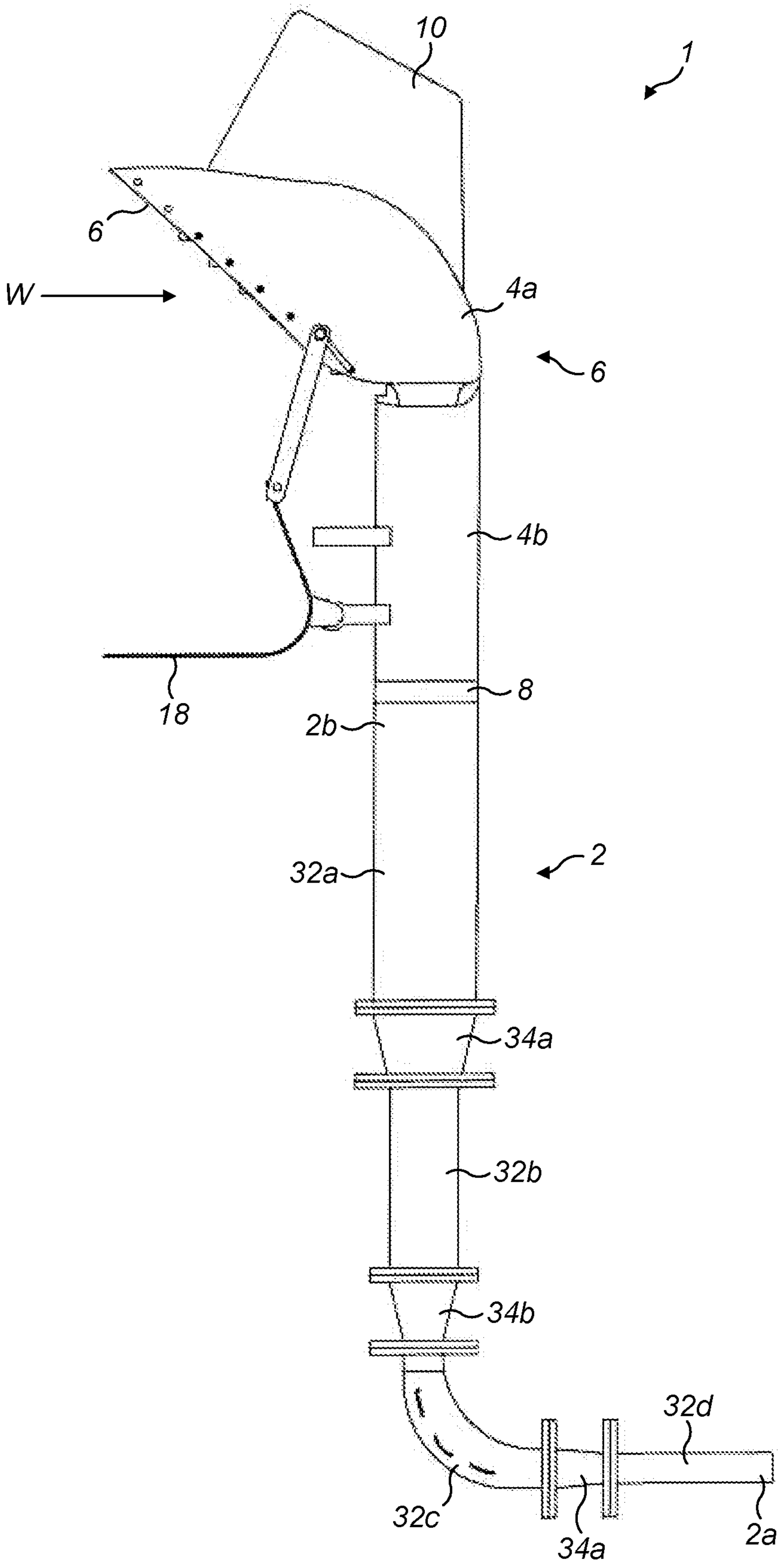
FIG. 1 is a side view of a structure according to the present invention.
Figure 2:
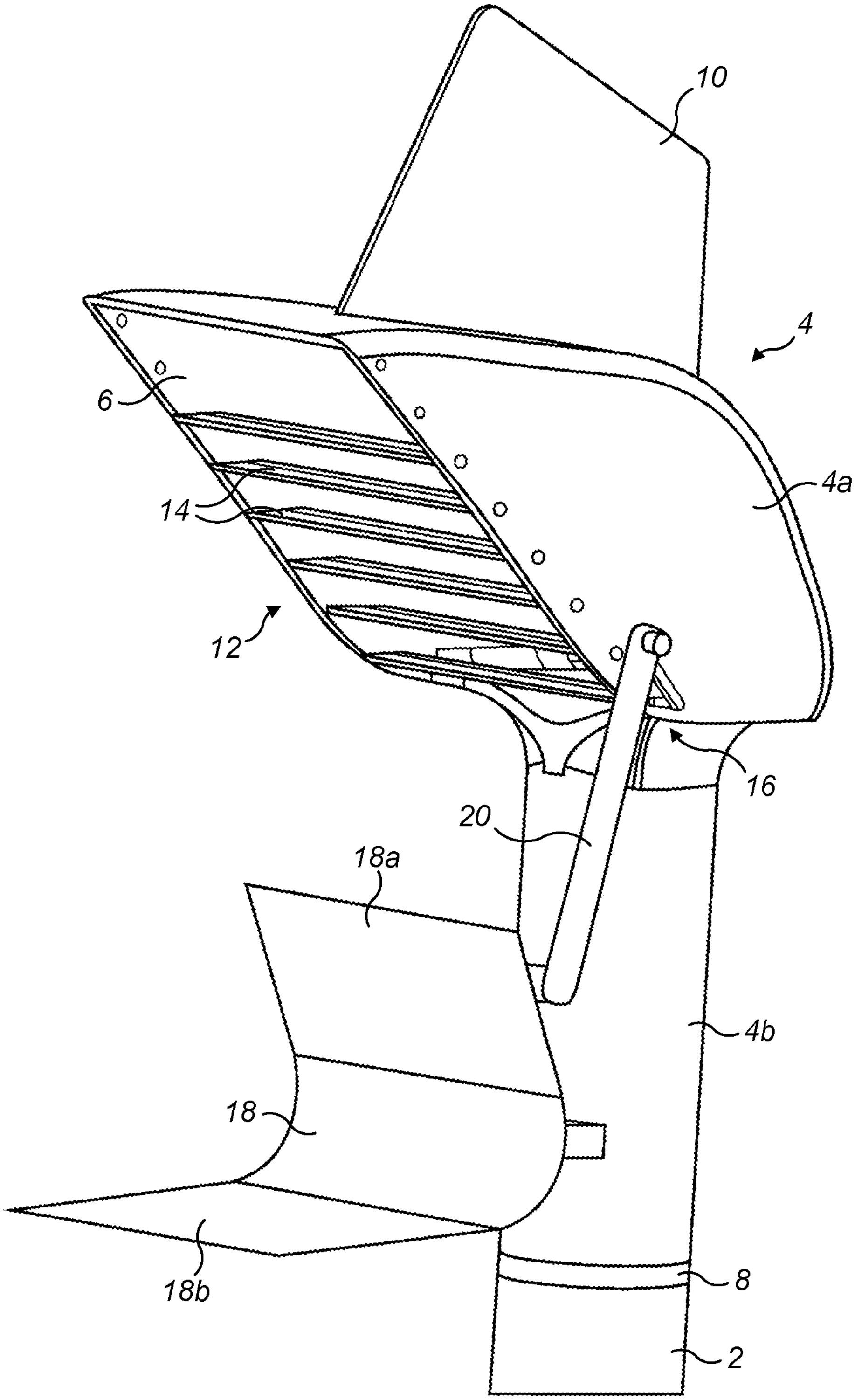
FIG. 2 is a perspective view of the intake of the structure of FIG. 1.
Figure 3:
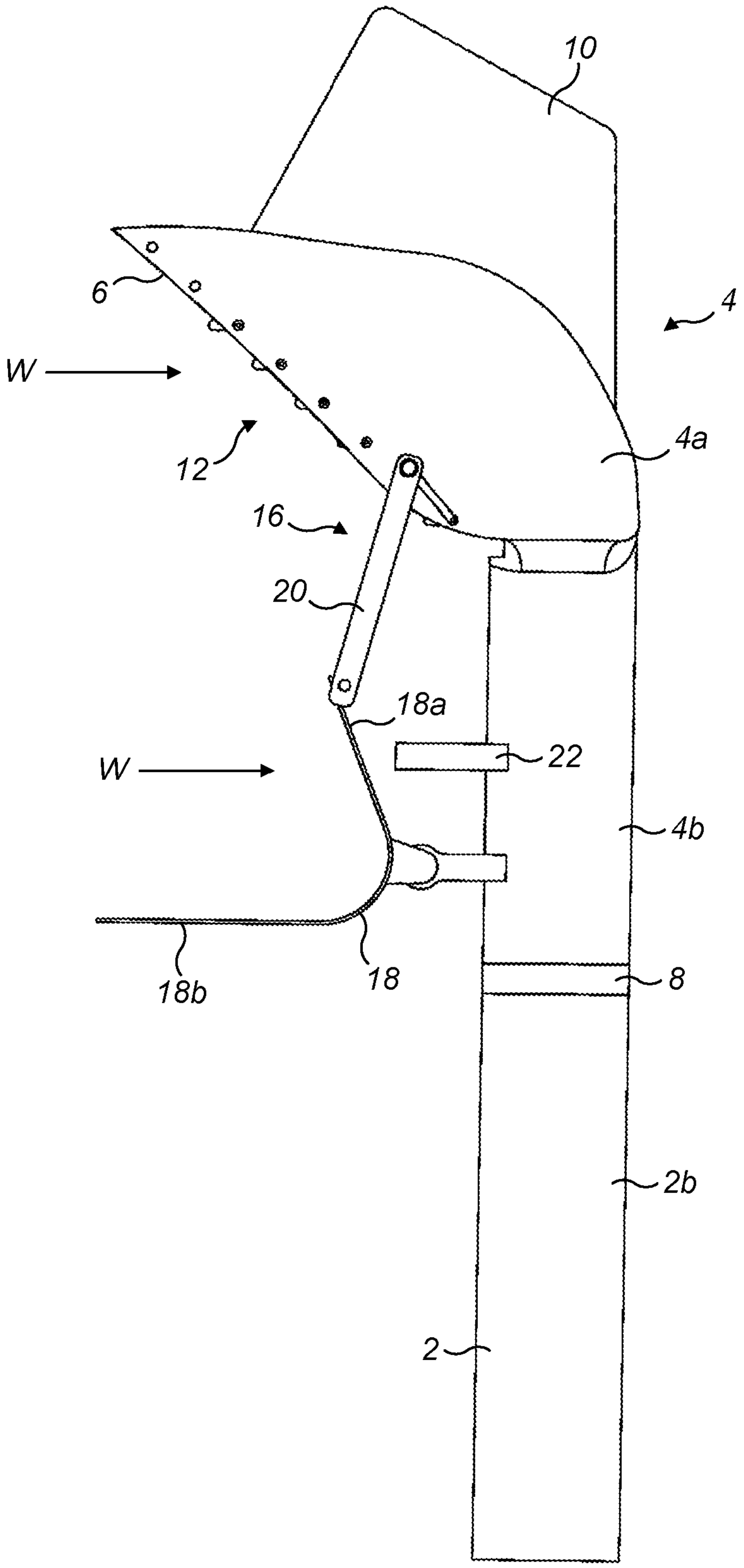
FIG. 3 is a side view of the intake of FIG. 2 with the wind resistance plate in a first position and the slats of the louvre assembly in an open position.
Figure 4:
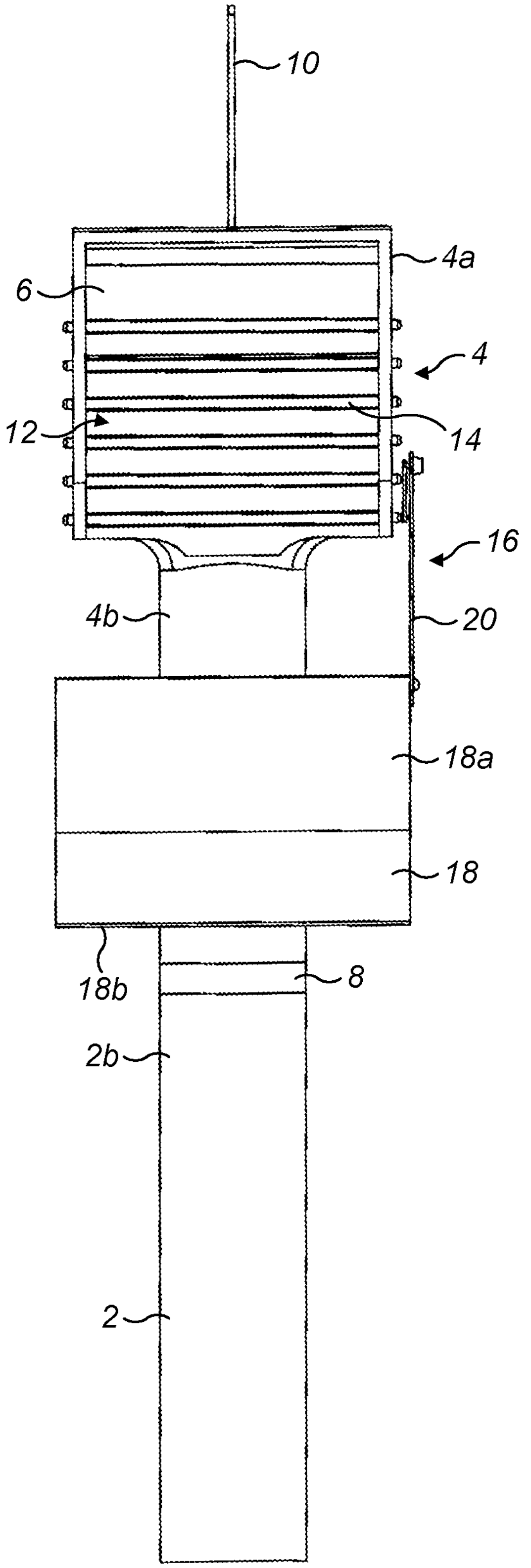
FIG. 4 is a front view of the intake of FIG. 3.
Figure 5:
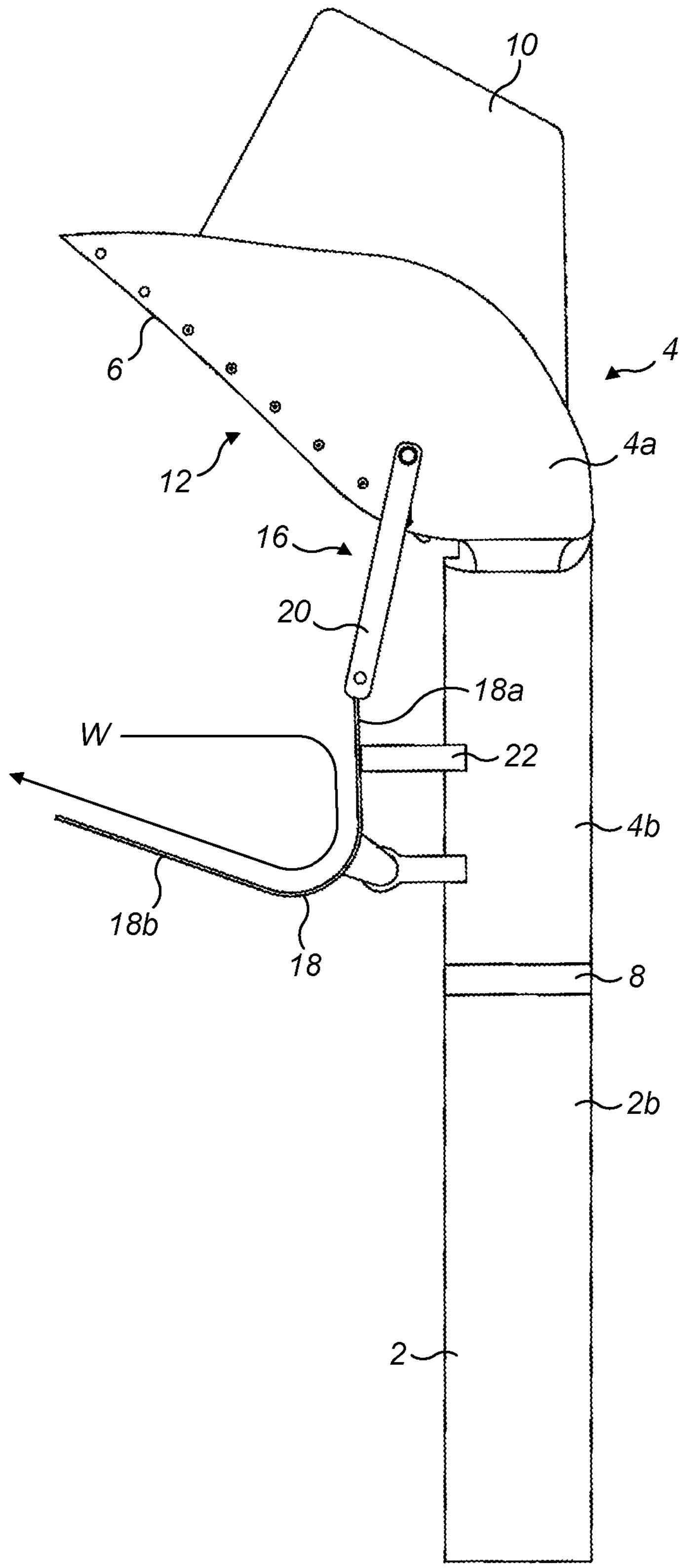
FIG. 5 is a side view of the intake of FIG. 2 with the wind resistance plate in a second position and the slats of the louvre assembly in a closed position.
Figure 6:
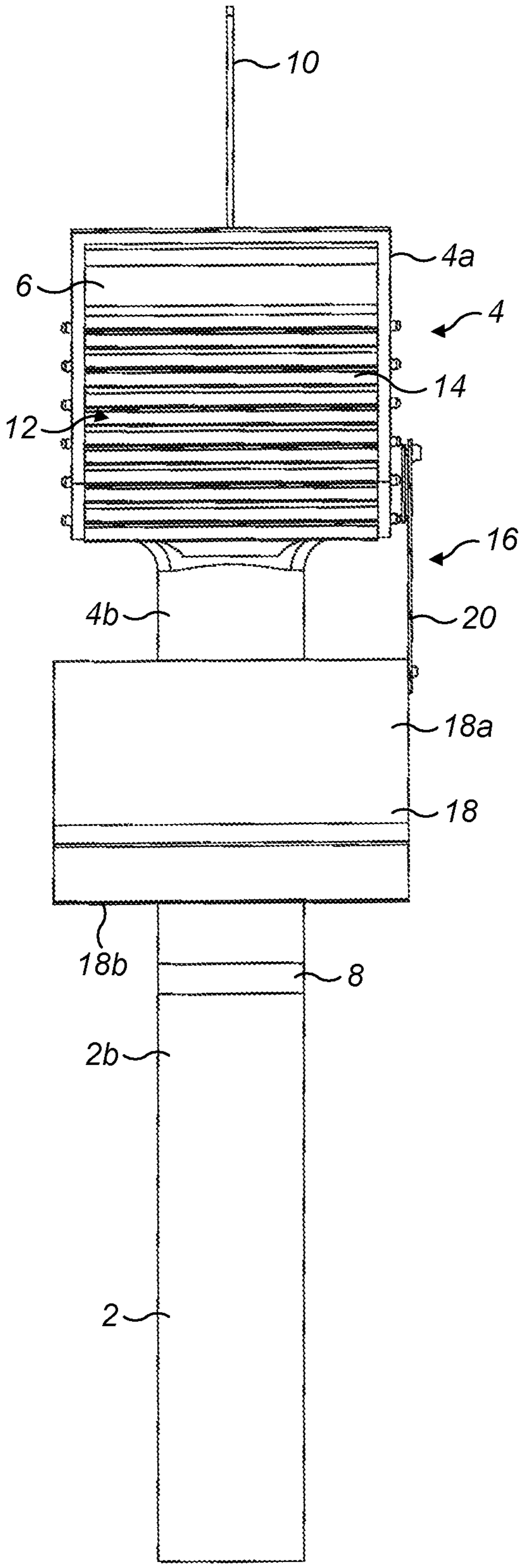
FIG. 6 is a front view of the intake of FIG. 5.

With reference to FIG. 1, the present invention provides a structure 1 for channelling and directing incident wind comprising a hollow pipe 2 and an intake 4.

The pipe 2 has a downstream end **2*a* that defines an outlet, and an upstream end 2*b***.

The intake 4 is rotatably mounted at the upstream end **2*b* of the pipe and is adapted to direct incident wind (which is indicated by arrows labelled "W" in the Figures) into the pipe 2. The intake 4 includes a "head" part 4*a* and a "neck" part 4*b*** that is formed as a hollow vertical pipe.

With reference to FIGS. 2 to 6, the head part **4*a* of the intake 4 includes a housing that defines an opening or vent 6 through which incident wind enters the intake, and an internal structure that directs the wind from the opening into the neck part 4*b* and towards the upstream end 2*b* of the pipe 2. The opening 6 shown in FIGS. 2 to 6 is substantially rectangular, but it will be understood that it may have any suitable shape. The opening 6 is formed in an angled front part of the head part 4*a* as shown. The upper part of the head part 4*a* of the intake 4 therefore overhangs the louvre assembly 12—see below—to protect it and help prevent rain from entering the neck part 4*b***.

The intake 4 is rotatably mounted about a vertical axis.

The neck part **4*b* of the intake 4 is rotatably mounted relative to the pipe 2 by a bearing 8**.

A directional vane 10 is formed on an upper part of the head part **4*a* of the intake 4. The directional vane 10 enables the incident wind to rotate the intake 4 so that the angled front part and the opening 6 faces the wind direction. More particularly, if the wind direction changes, the wind force acting on the directional vane 10 will cause the intake 4** to rotate to face the incident wind. It will be understood that the intake may also be driven to rotate by sensing wind direction (e.g., using wind sensor) and rotating the intake using an actuator such as an electric motor that is controlled by a suitable controller.

A louvre assembly 12 is used to control the amount of incident wind that is permitted to enter the intake opening 6, and hence the amount of incident wind that is directed by the intake 4 to the upstream end **2*b* of the pipe 2. The louvre assembly 12 includes a plurality of individual slats 14 that are pivotally mounted so that their angle may be adjusted by an adjustment mechanism 16. The ends of each slat 14 are pivotally mounted in a support or frame formed by opposite side parts of the head part 4*a* of the intake 4**.

The slats 14 are pivoted between a closed position where the slats lie substantially in the same plane and overlap slightly to form a closed and angled barrier to prevent wind from entering the intake 4, and a fully open position where the slats define a plurality of open channels therebetween to allow substantially all of the incident wind to enter the intake. In the louvre assembly 12 shown in FIGS. 2 to 6, the slats 14 do not cover all of the intake opening 6 so some incident wind will enter the intake 4 even when the slats are in the closed position. But it will be understood that the slats can be arranged to cover substantially all of the intake opening so that almost no incident wind enters the intake when the slats are in the closed position.

The angle of the slats 14 is adjusted based on wind speed—e.g., so that the slats are fully open when the wind speed is below a lower threshold and are closed when the wind speed is above an upper threshold. The angle of the slats 14 is adjusted mechanically based on the wind speed using a L-shaped wind resistance plate 18 that forms part of the adjustment mechanism 16. The wind resistance plate 18 is pivotally mounted on the neck part **4*b* of the intake 4 by a mounting bracket. The wind resistance plate 18 is positioned below the louvre assembly 12 and the intake opening 6 and its angle relative to the intake varies with wind speed. In particular, the wind resistance plate 18 is designed so that the incident wind impinges on a first (or substantially vertical) part 18*a* of the plate. The wind force acting on the wind resistance plate 18 may pivot the first part 18*a* of the plate backwards to the second position where the slats 14 are in the closed position. Consequently, incident wind can be prevented from entering the intake 4** if the wind speed exceeds the upper threshold at which the structure or any downstream components might be damaged.

The pivoting movement of the wind resistance plate 18 is used to adjust the angle of the slats 14 and the adjustment mechanism 16 includes a lever arm mechanism 20 for translating the pivoting movement of the plate to the slats. The lever arm mechanism 20 is connected between the wind resistance plate 18 and the lowest slat as shown. The slats 14 are connected together such that they pivot in unison with the lowest slat. The wind resistance plate 18 is biased towards a first position shown in FIGS. 2, 3 and 4 where the slats 14 are in the fully open position. The wind resistance plate 18 may be pivoted towards the second position depending on the speed of the incident wind and hence the wind force that acts on the first part **18*a* of the plate. In the second position shown in FIGS. 5 and 6, the slats 14 of the louvre assembly 12 are in the closed position. Further pivoting movement of the wind resistance plate 18 is prevented by a stop 22 on the neck part 4*b* of the intake 4 that is most clearly seen in FIG. 5**.

The wind resistance plate 18 is biased towards the first position by a spring or other suitable biasing means. In the intake 4 shown in FIGS. 2 to 6, the biasing means is integrated with the slats 14, but other suitable biasing means would include a spring connected between a second (or substantially horizontal) part **18*b* of the wind resistance plate and the neck part of the intake, or a biasing means that it is integrated with the mounting bracket that pivotally connects the wind resistance plate to the neck part of the intake or integrated with the adjustment mechanism, for example. The biasing means applies a biasing force to the wind resistance plate 18 that opposes the wind force that acts on the first part 18*a* of the plate. The biasing force ensures that the default position for the wind resistance plate 18 is the first position where the slats 14 are open to allow incident wind to enter the intake 4**.

Incident wind that impinges on the first part **18*a* of the wind resistance plate 18 may be guided along the second part 18***b* of the plate—and is preferably directed in the opposite direction to the wind direction, i.e., back towards the incident wind.

Incident wind that impinges on the closed slats 14 may also be directed downwardly towards the L-shaped wind resistance plate 18 and then directed in the opposite direction to the wind direction. If the wind speed falls, the wind resistance plate 18 may pivot back to the first position where the slats 14 are fully open under the biasing force applied by the biasing means.

The interior angle between the first and second parts 18*a*, 18*b* of the L-shaped wind resistance plate 18 may be between about 60 and about 120 degrees, for example.

Figure 7:
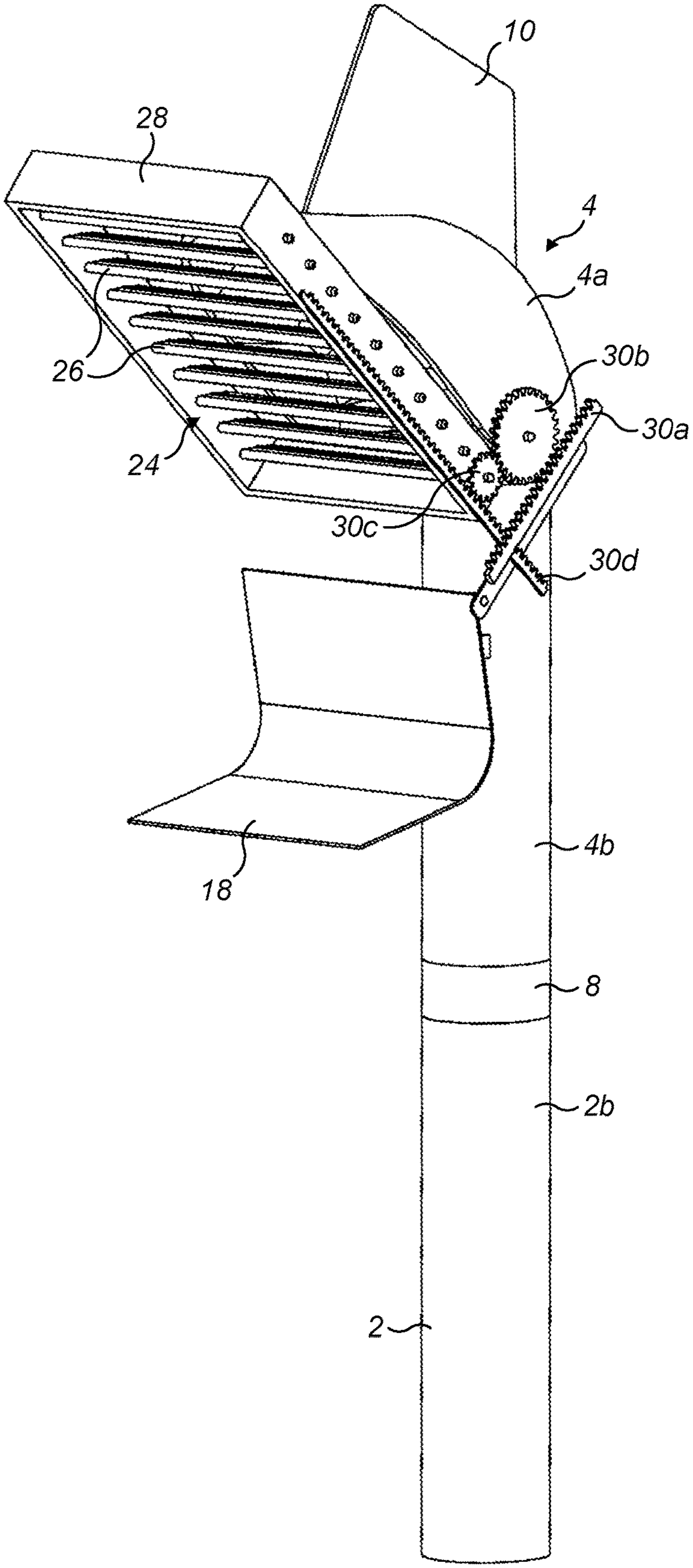
FIG. 7 is a perspective view of an alternative intake.
Figure 8:
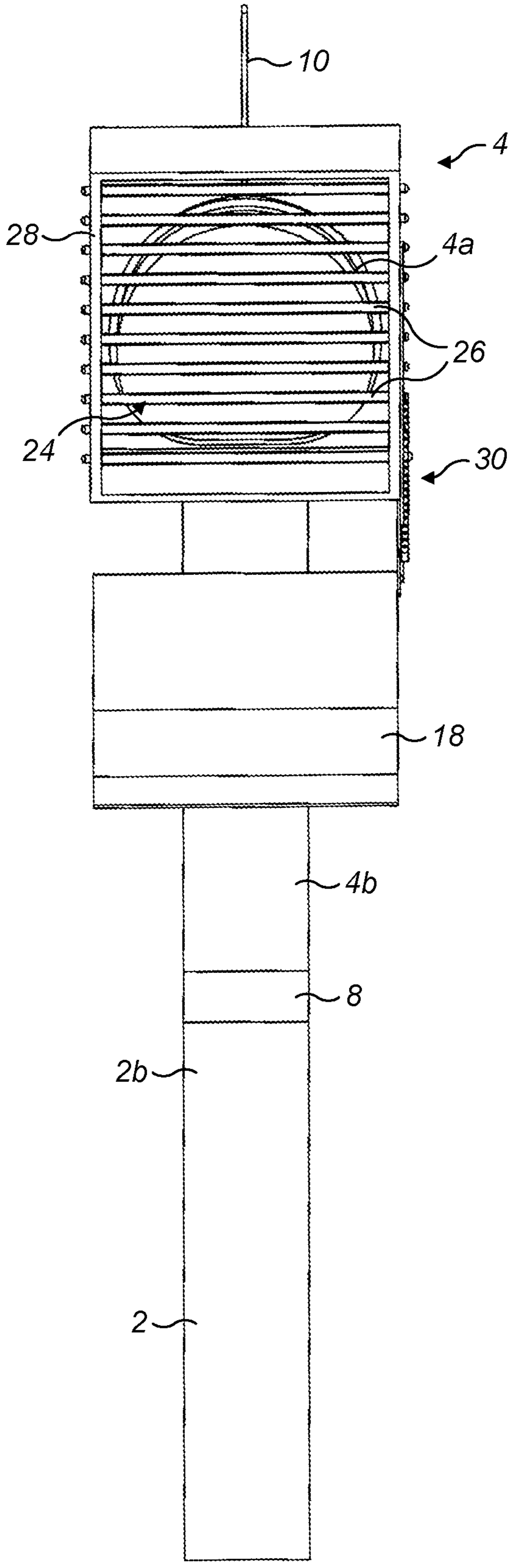
FIG. 8 is a front view of the alternative intake of FIG. 7.

In the alternative louvre assembly 24 shown in FIGS. 7 and 8, the slats 26 are mounted in a separate rectangular frame 28 that is positioned in front of the intake opening. The adjustment mechanism includes a gearing mechanism 30 to translate the pivoting movement of the L-shaped wind resistance plate 18 to the slats 26. The gearing mechanism 30 includes a first rack 30*a*, a first pinion gear 30*b* and a second pinion gear 30*c*. The first pinion gear 30*b* is driven to rotate by the lateral movement of the first rack 30*a*. The second pinion gear 30*c* is driven to rotate by the first pinion gear 30*b* and causes the lowest slat to pivot in response to the pivoting movement of the wind resistance plate 18. A second rack 30*d* is shown and can be used to drive additional pinion gears (not shown) that cause the other slats 26 to pivot in unison with the lowest slat.

It will be understood that the adjustment mechanism which adjusts the angle of the slats may include an actuator such as an electric motor that is controlled by a suitable controller based on the wind speed. Other actuators might include pneumatic, hydraulic or electro-mechanical actuators, for example.

The upstream end 2*b* of the pipe 2 is vertical and is designed to rotatably mount the intake 4 by means of the bearing 8.

The downstream end 2*a* of the pipe 2 is horizontal.

The pipe 2 is formed from a plurality of individual pipe sections 32*a*, 32*b*, . . . , 32*d* as shown in FIG. 1. It will be understood that the arrangement of pipe sections in FIG. 1 is just for the purposes of illustrating the structure of the present invention and that any suitable number and arrangement of pipe sections may be used.

The pipe sections 32*a*, 32*b* and 32*d* are straight pipe sections. Pipe section 32*c* is a curved pipe section.

The pipe sections 32*a*, 32*b*, . . . , 32*d* have different internal diameters. In particular, the pipe section 32*a* at the upstream end 2*b* of the pipe 2 has a larger internal diameter than the pipe section 32*b*, the pipe section 32*b* has a larger internal diameter than the pipe section 32*c*, and so on. In this way, the diameter of the pipe 2 is narrowed gradually along the direction from the upstream end 2*b* to the downstream end 2*a* that defines the outlet. Narrowing the internal diameter of the pipe 2 results in an increase in the wind velocity through the pipe in the downstream direction towards the outlet and in a corresponding reduction in pressure.

The pipe sections 32*a*, 32*b*, . . . , 32*d* are connected together by couplers 34*a*, 34*b* and 34*c*. The couplers 34*a*, 34*b* and 34*c* have a frusto-conical inner surface to channel (or "funnel") the wind from one pipe section to another. The pipe sections 32*a*, 32*b*, . . . , 34*d* and the couplers 34*a*, 34*b* and 34*c* are mechanically connected together by respective outwardly extending connecting flanges which receive mechanical fixings such as bolts. More particularly, adjacent connecting flanges are positioned in abutment and bolts are passed through aligned openings 48 in the respective connecting flanges to secure the pipe section and the coupler together. The connecting flanges can also be used to connect pipe sections together in the same manner without an interposing coupler.

Figure 9:
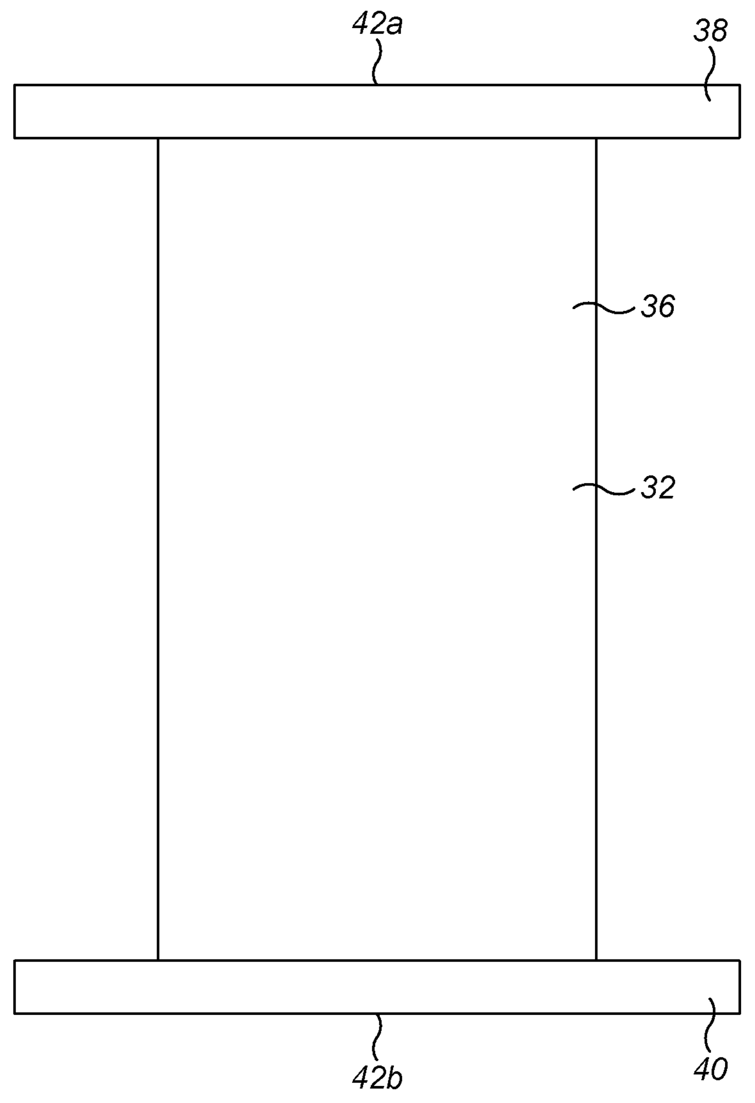
FIG. 9 is a side view of a straight pipe section.
Figure 10:
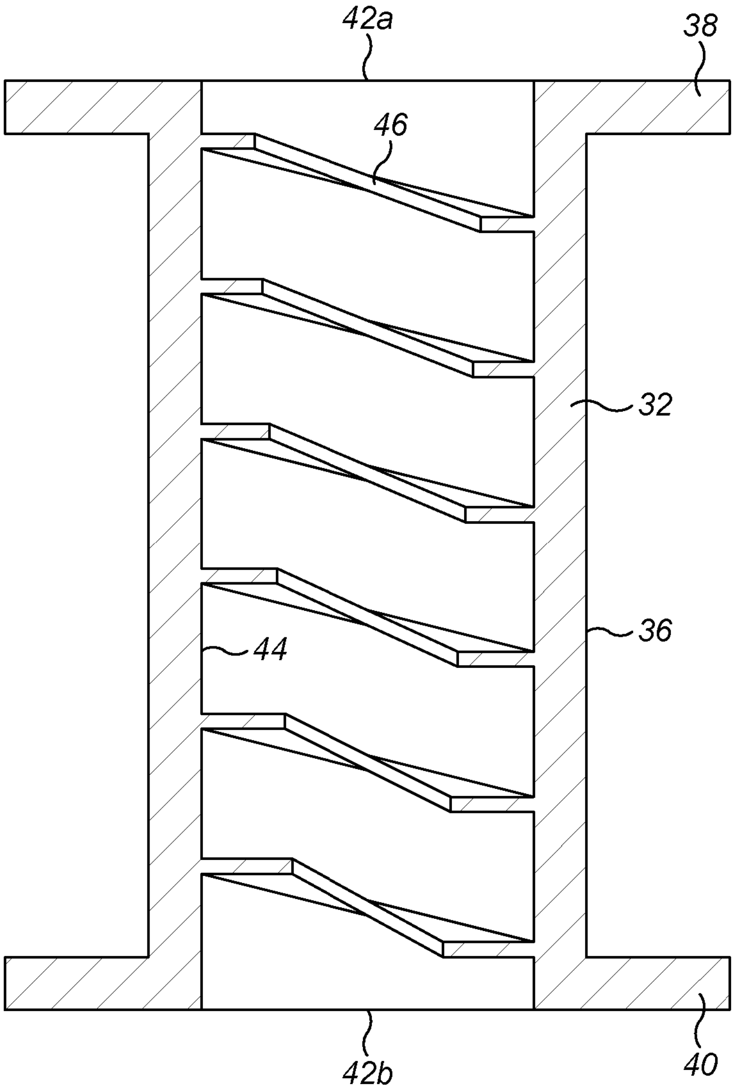
FIG. 10 is a cross-section view of the straight pipe section of FIG. 9.
Figure 11:
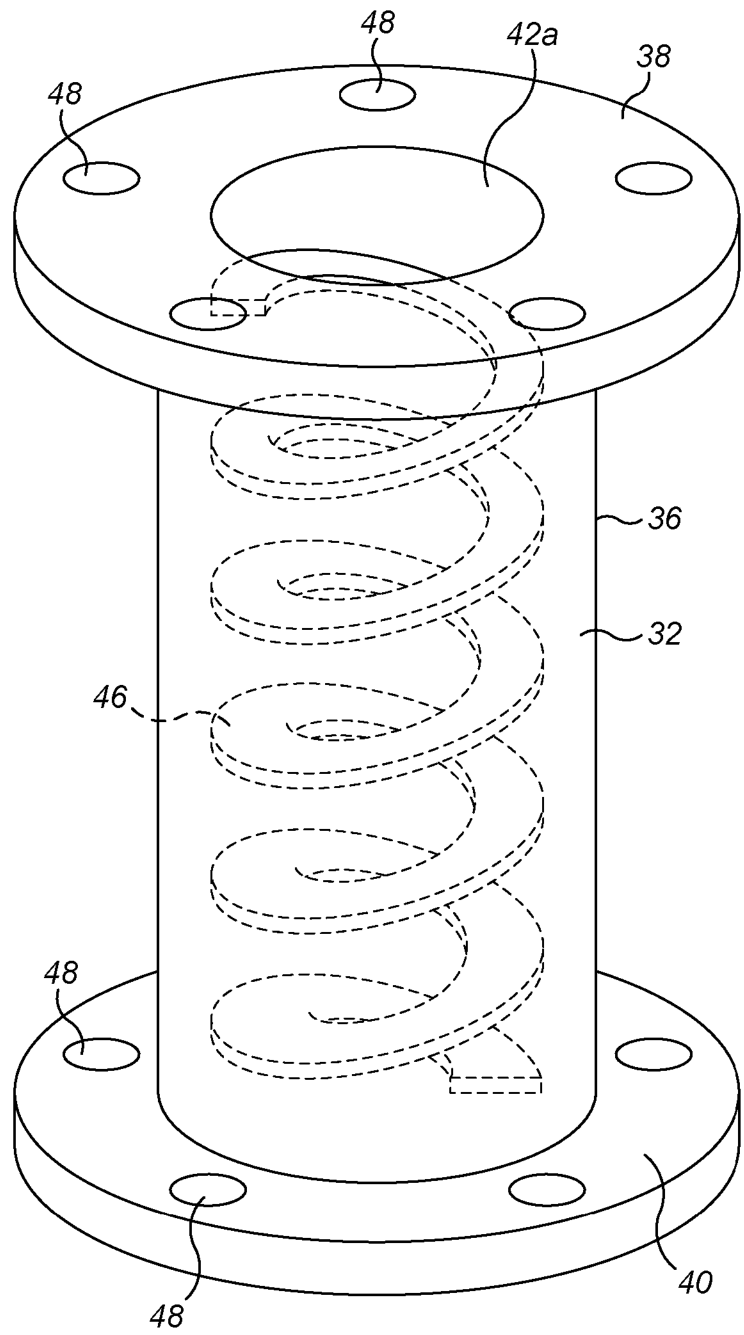
FIG. 11 is a perspective view of the straight pipe section of FIGS. 9 and 10.

With reference to FIGS. 9 to 11, a straight pipe section 32 includes a cylindrical outer surface 36, a first connecting flange 38, and a second connecting flange 40. The straight pipe section 32 has an upstream end 42*a* and a downstream end 42*b*. Each connecting flange includes a plurality of spaced openings 48 for receiving the bolts. The pipe section 32 includes a cylindrical inner surface 44. An internal helical flange 46 extends substantially perpendicular to the cylindrical inner surface 44 of the pipe section 32 and may be welded to the inner cylindrical surface, for example. The width of the internal helical flange 46 increases in the downstream direction, i.e., from the upstream end 42*a* towards the downstream end 42*b*. (In other words, the internal helical flange 46 extends further into the hollow interior of the pipe section at the downstream end of the flange than it does at the upstream end of the flange.) The internal helical flange 46 promotes helical movement of the wind through the pipe. It is believed that promoting such helical movement, where the wind has both a linear and rotational component of movement from the upstream end of the pipe toward the downstream end, will reduce the turbulence within the hollow pipe 2 and will help to move the incident wind through the pipe as efficiently as possible. It may also help to remove any particulates, debris or liquid droplets that are entrained in the wind, and in particular where the rotational effect of the wind can be used to expel the particulates, debris or liquid droplets through openings or slots in the pipe—see below.

The internal helical flange may be omitted in some pipe sections, e.g., the curved pipe section 32*c*.

The downstream pipe section 32*d* that defines the outlet may be provided with a helical groove (or "rifling" groove) in its cylindrical inner surface instead of an internal helical flange.

Figure 12:
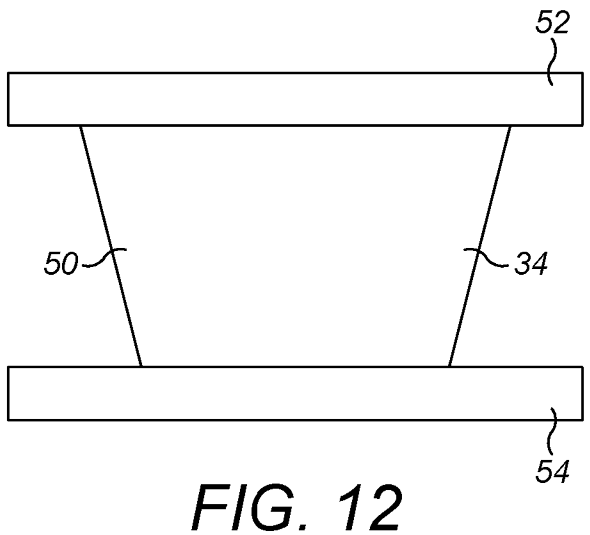
FIG. 12 is a side view of a coupler.
Figure 13:
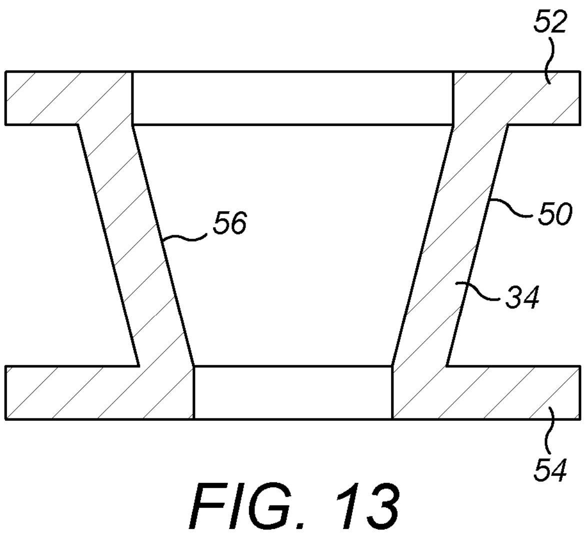
FIG. 13 is a cross-section view the coupler of FIG. 12.

With reference to FIGS. 12 and 13, a coupler 34 includes a frusto-conical outer surface 50, a first connecting flange 52, and a second connecting flange 54. Each connecting flange includes a plurality of spaced openings for receiving the bolts. The coupler 34 includes a frusto-conical inner surface 56.

Figure 14:
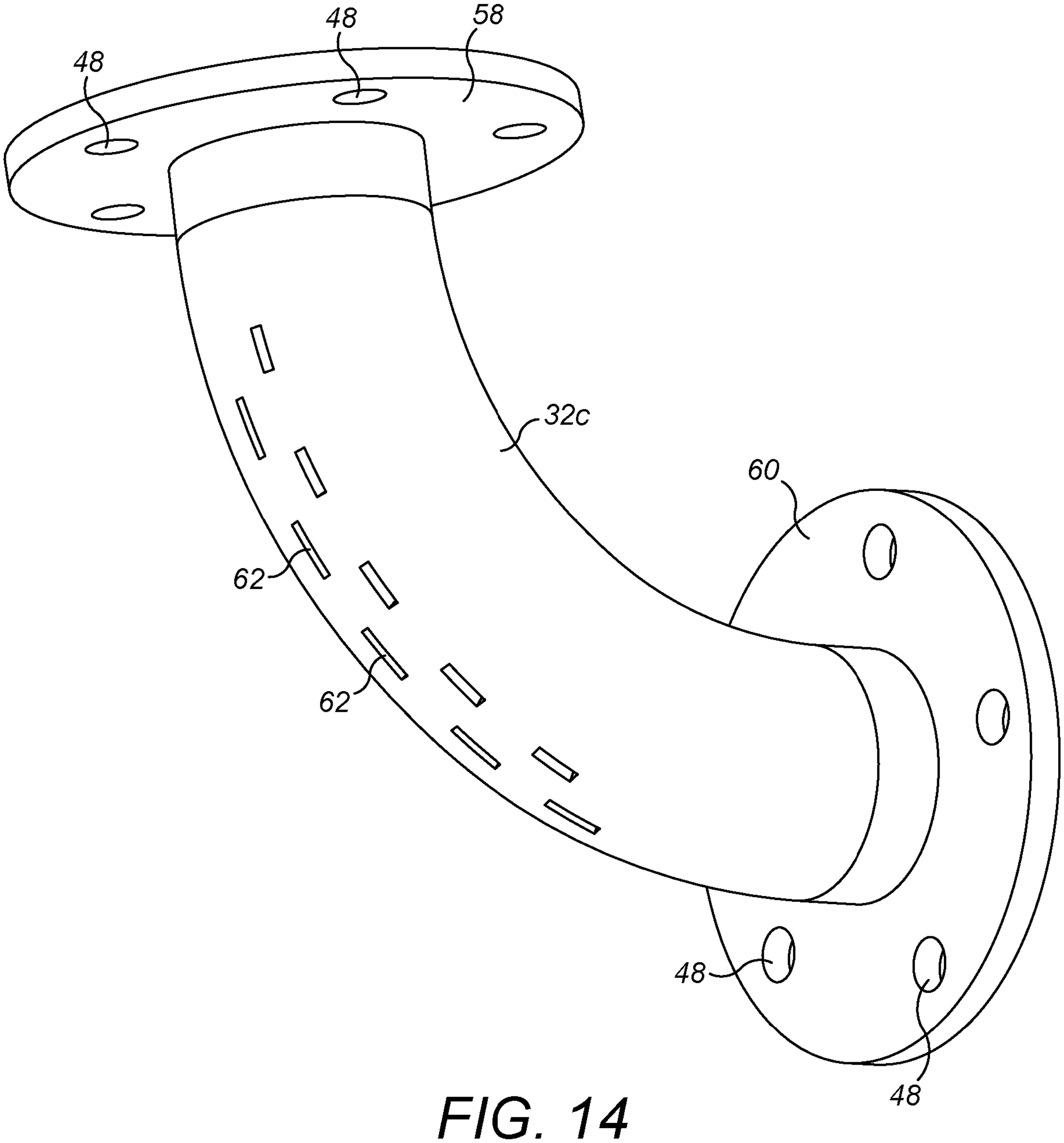
FIG. 14 is a perspective view of a curved pipe section.

As mentioned briefly above, the pipe 2 may include openings or slots through which any entrained particulates, debris or liquid droplets (and a small quantity of wind) may be ejected. FIG. 14 shows the curved pipe section 32*c* with a first connecting flange 58 and a second connecting flange 60. Openings or slots 62 are provided in the radially outer part of the curved pipe section 32*c* through which the particulates, debris or liquid droplets may be expelled from the pipe.

Figure 15:
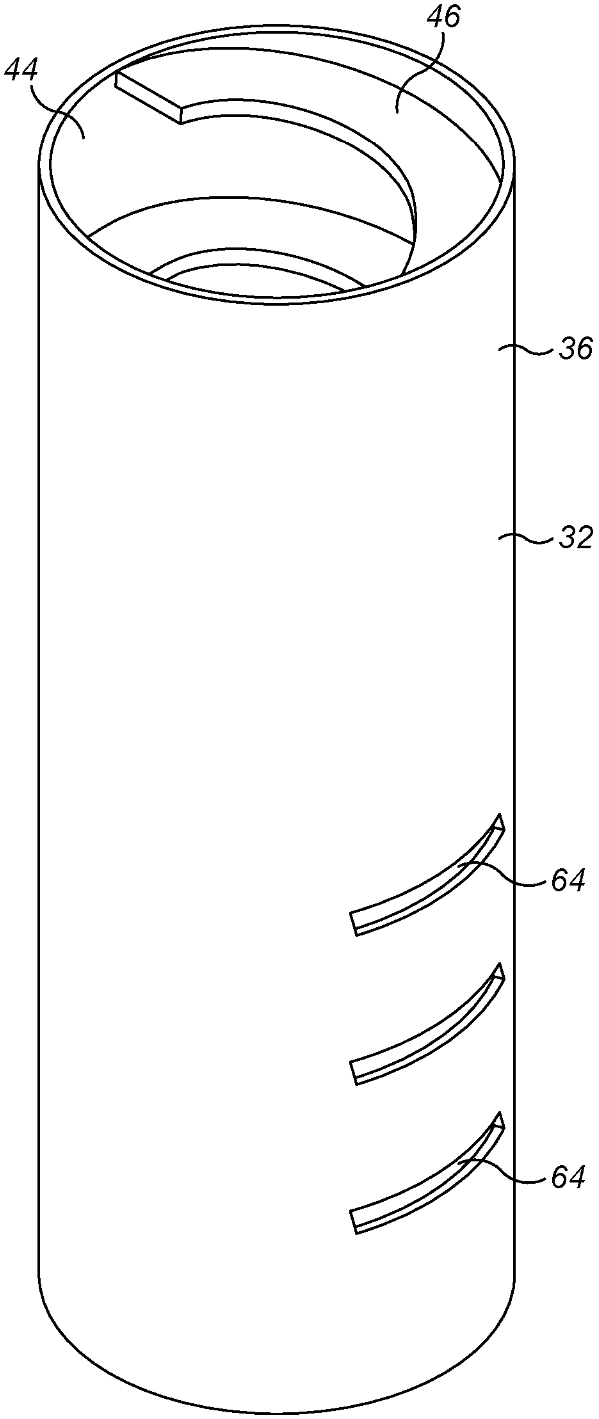
FIG. 15 is a perspective view of part of a straight pipe section showing slots.

If the pipe section includes an internal helical flange, the openings or slots in the pipe section may be aligned with the helical channel defined by the internal helical flange. This is shown in FIG. 15 where the openings or slots 64 in the straight pipe section 32 are angled and are aligned with the internal helical channel.

Although not shown, the pipe 2 may be positioned to channel and direct the incident wind on to a turbine assembly or a ventilation or cooling system positioned at the outlet.

The invention claimed is:

1. A structure for channelling and directing incident wind comprising:

a hollow pipe having a downstream end that defines at least one outlet, and an upstream end; and a rotatably mounted intake at the upstream end of the pipe adapted to direct incident wind into the pipe;

wherein the intake includes an opening through which incident wind enters the intake;

wherein the intake further comprises a louvre assembly positioned in front of the opening, wherein the louvre assembly comprises:

a plurality of individual slats that are pivotally mounted and can be pivoted between a fully open position and a closed position, and an adjustment mechanism for adjusting the angle of the slats and which includes a pivotally mounted wind resistance plate whose angle varies with wind speed.

2. A structure according to claim 1, wherein the wind resistance plate is biased towards a first position where the slats are in the fully open position and is pivotable towards a second position by the incident wind where the slats are in the closed position.

3. A structure according to claim 1, wherein the wind resistance plate is substantially L-shaped and includes a first part on which the incident wind impinges and a second part that directs the incident wind away from the intake.

4. A structure according to claim 3, wherein the angle between the first and second parts of the wind resistance plate is between about 60 and about 120 degrees.

5. A structure according to claim 1, wherein the intake includes an internal structure that directs the wind from the opening towards the upstream end of the pipe.

6. A structure according to claim 1, wherein the intake further comprises an angled front surface, and wherein the opening is formed in the angled front surface of the intake.

7. A structure according to claim 1, wherein the intake is rotatably mounted about a vertical axis.

8. A structure according to claim 1, wherein the intake further comprises an actuator that is adapted to drive the intake to rotate relative to the pipe based on a wind direction.

9. A structure according to claim 1, wherein the intake further comprises a directional vane.

10. A structure according to claim 1, wherein the upstream end of the pipe is substantially vertical, and the downstream end of the pipe is substantially vertical or horizontal.

11. A structure according to claim 1, wherein the pipe is formed from a plurality of pipe sections.

12. A structure according to claim 11, wherein the pipe sections have different internal diameters or cross-sectional areas.

13. A structure according to claim 12, wherein pipe sections with different internal diameters or cross-sectional areas are connected together by intermediate sections with a frusto-conical inner surface or one or more angled or sloping inner surfaces.

14. A structure according to claim 1, wherein at least part of the pipe includes an internal helical flange or groove.

15. A structure according to claim 1, wherein the structure defines a downstream direction extending from the upstream end of the pipe to the downstream end of the pipe, and wherein at least part of the pipe includes an internal helical flange having a width that increases in the downstream direction.

16. A structure according to claim 1, wherein the pipe includes one or more openings or slots.

17. A structure according to claim 1, further comprising at least one filter screen.

18. A structure according to claim 1, wherein the downstream end of the pipe is divided to define two or more outlets.

* * * * *